Jan. 22, 1952      J. J. MAYER      2,583,223
FOOT AND LEG REST FOR ROW SEATS
Filed Oct. 30, 1947      2 SHEETS—SHEET 1
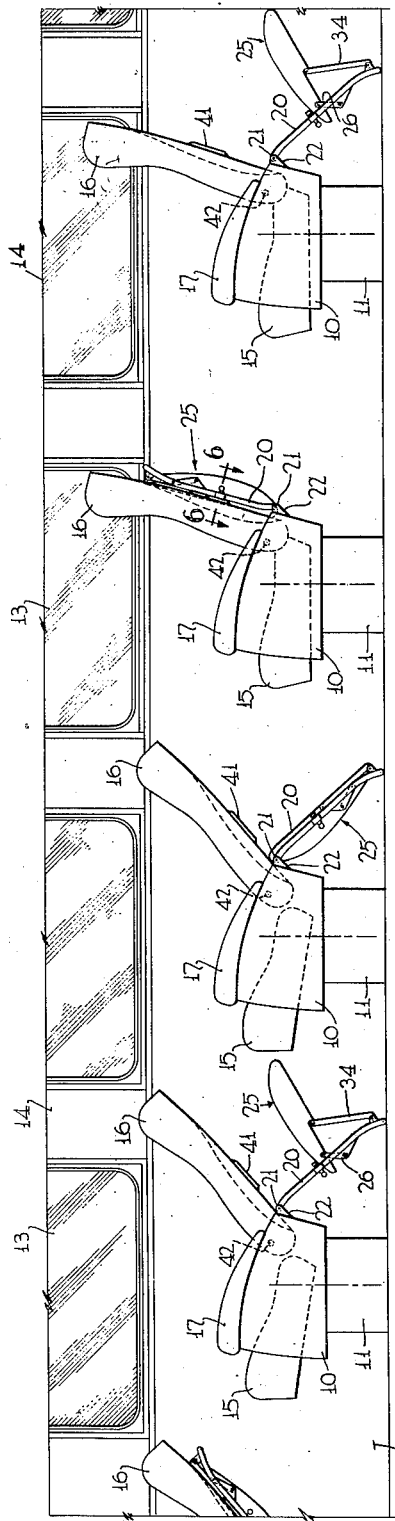
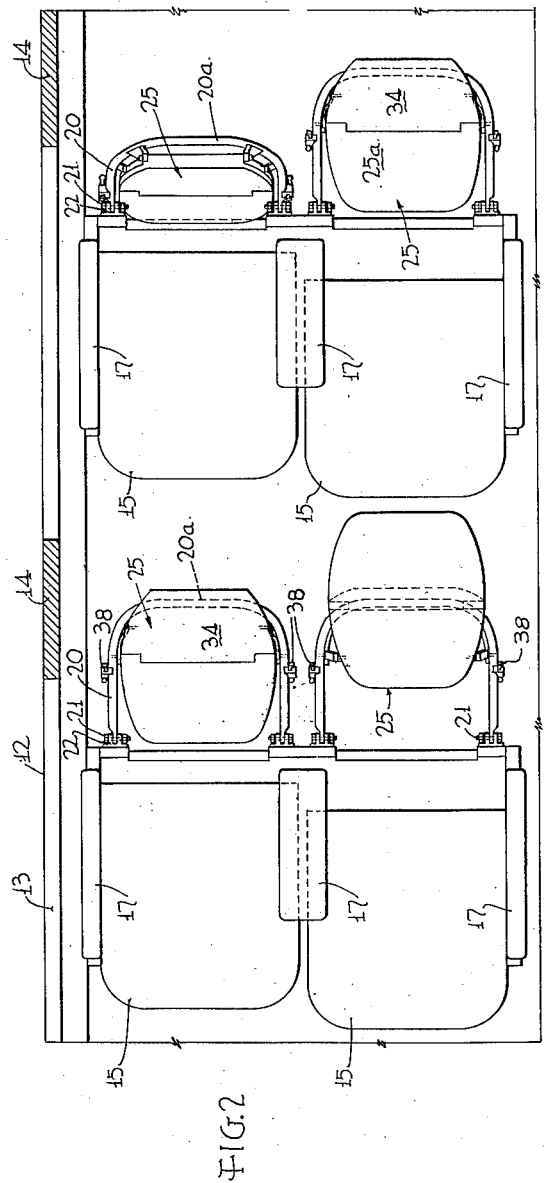
*INVENTOR*
John J. Mayer.
BY Maurice A. Crews
*ATTORNEY*

Jan. 22, 1952 — J. J. MAYER — 2,583,223
FOOT AND LEG REST FOR ROW SEATS
Filed Oct. 30, 1947 — 2 SHEETS—SHEET 2
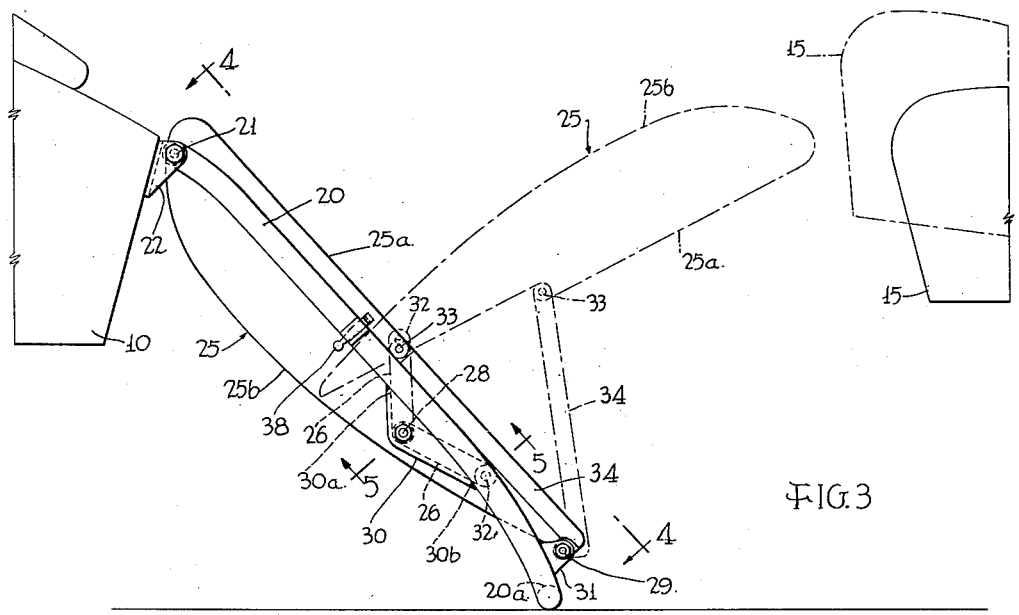
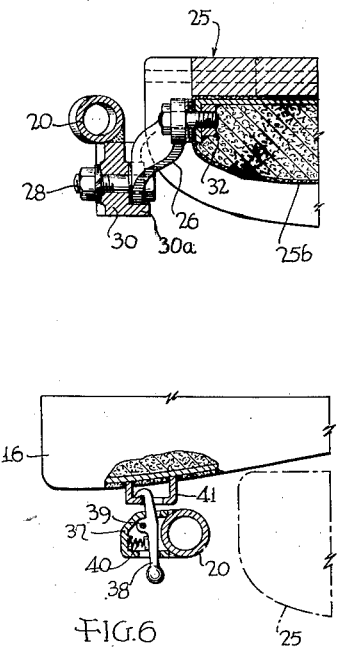
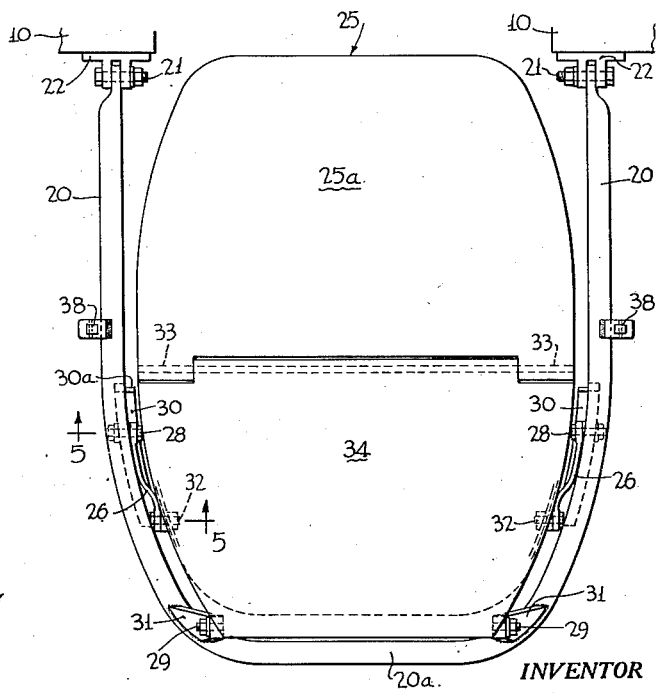
INVENTOR
John J. Mayer.
BY Maurice A. Crews
ATTORNEY Patented Jan. 22, 1952

2,583,223

UNITED STATES PATENT OFFICE 2,583,223

FOOT AND LEG REST FOR ROW SEATS

John J. Mayer, Philadelphia, Pa., assignor, by mesne assignments, to Heywood-Wakefield Company, Gardner, Mass., a corporation of Massachusetts Application October 30, 1947, Serial No. 783,163

4 Claims. (Cl. 155—171)

This invention relates to a foot and leg rest for row seats, being particularly adapted for use in passenger vehicles, and has for an object the provision of improvements in this art.

One of the particular objects of the invention is to provide a foot and leg rest which serves a rear seat and which folds toward a front seat, providing a passage to the rear seat in all but its most extended condition.

Another object is to provide a foot and leg rest which is supported by a front seat in inactive position and is partly supported at the front in active position but which presents no annoyance to the front seat passenger when in use.

Another object is to provide a foot and leg rest which may be very quickly and easily moved out of its most extended position to permit passage to the rear seat which it serves or to an outside seat which requires passage in front of the aisle seat.

Another object is to provide a foot and leg rest which requires no support in any position from the rear seat which it serves and which requires no fixed floor support which would obstruct the free floor passage between seats.

Another object is to provide a foot and leg rest which will give the maximum comfort with the minimum distance spacing between seats.

Another object is to provide the desired advantages with a very simple and inexpensive construction and which does not prevent revolving seats from being turned in the usual way.

The above and other objects and advantages of the invention will be apparent from the following description of an exemplary embodiment thereof, reference being made to the following drawings, in which:

Fig. 1 is a side elevation of a row of passenger vehicle seats embodying the invention;

Fig. 2 is an enlarged top plan view with the seat backs removed and the foot and leg rests arranged in various positions;

Fig. 3 is a further enlarged elevation showing in full lines the device in position to be used as a foot rest and in dot-and-dash lines its position to be used as a leg rest;

Fig. 4 is a face view of the device when positioned for use as a foot rest, the view being taken on the line 4—4 of Fig. 3;

Fig. 5 is a partial section taken on the line 5—5 of Figs. 3 and 4; and

Fig. 6 is an enlarged section taken on the line 6—6 of Fig. 1, showing a latch for holding the device in inactive or non-use position.

Referring to Figs. 1 and 2, there is shown a row of seats or chairs 10 supported on floor bases 11, one behind the other. The chairs are shown within the side wall 12 of an enclosed structure, such as a passenger vehicle, bus, aircraft or the like, having windows 13 and panels 14. It will be assumed that the seats are mounted in pairs for reversing movement on their bases, as by being pulled out, turned and pushed back in well-known manner. The chairs comprise cushions 15, backs 16 and arm rests 17.

In this preferred embodiment, the foot and leg rest attachment of my invention is connected to the rear of each seat 10, and includes in its general organization a supporting frame 20, a cushion 25, and a linkage system between the cushion 25 and the frame 20 adapted to support the cushion 25 in either a leg rest or a foot rest position.

The frame 20 is made of a single piece of metal tubing formed roughly in a U-shape and is pivotally connected at each end of the U to the seat 10 by pivots 21 mounted on brackets 22 secured to the rear of the seat 10 at approximately seat cushion height. Being so mounted, the frame 20 is free to pivot upward to a position against the chair back 16 and downward to a rearwardly inclined position with its end 20a resting on the floor.

The cushion 25 is essentially flat and comprises a substantially rigid back 25a and an upholstered front 25b.

The linkage system which serves to support the cushion 25 within the frame 20 may, for purposes of convenience, be termed a four sided linkage mechanism, and is adapted to support the cushion 25 in either of two positions. First, in a foot rest position in substantial alignment with the frame 20 and with the rigid back 25a of the cushion 25 uppermost to serve as a foot rest for the occupant of the seat next to the rear. Second, in an elevated and forwardly inclined position with the upholstered front 25b uppermost to serve as a leg rest for the said occupant. In order to accomplish this, a pair of short side links 26 pivotally interconnect each side of the lower end of the cushion 25 with an intermediate point in the frame 20. Brackets 30 and pivots 28 one on each side of the frame serve as connections on the frame 20 for the side links 26, and pivots 32 one on each side of the cushion 25 serve as connections for the side links 26 to the cushion 25. To complete the linkage system, a plate 34 pivotally interconnects an intermediate point in the cushion back 25a and the lower end of the frame 20. The plate 34 is connected to the cushion back 25a by means of a pin 33, and to the frame 20 by means of pivots 29 mounted in brackets 31 secured on each side to the said frame. While the plate 34 does not resemble a conventional link its function is essentially that of a link as becomes particularly apparent when viewed from the side as is shown in Fig. 3.

The four sides of the linkage system, therefore, include the side links 26, the plate 34, the part of the cushion 25 between the pivots 32 and the pin 33, and the part of the frame between the pivots 28 and the pivots 29.

In the foot rest position, the linkage system is inverted or folded more or less within itself with all four sides in substantial alignment with the frame 20. This position is shown in full lines in Figure 3, with the side links 26 shown in dotted lines due to the position of the brackets 30. In the foot rest position, the links 26 abut against flanges 30b extending inward from the lower margin of each bracket 30, thus holding the cushion in such position. It will be noted also that the cushion back 25a is recessed to receive the plate 34 and that, in the foot rest position, the cushion back 25a is pivoted into parallel alignment with the said plate 34. Thus the plate 34 presents a flat continuation of the foot rest surface and being of metal construction is particularly suited to resist abrasion from shoe heels and the like. In order to attain a precise relationship of inverted alignment in a four sided linkage system such as that employed herein it will be noted that the difference between length of any two adjacent sides in the system must equal the difference between the length of the other two sides. While such is empirically true, however, it will be seen that such dimensions need only be approximate in order to carry out my invention.

In the leg rest position the linkage system is open, that is, essentially in the form of a trapezium, and the side links 26 abut against flanges 30a extending inward from the forward and uppermost margins of the brackets 30, thus preventing further forward pivotal motion of the linkage system. Two things are to be noted about the arrangement in the leg rest position. First, the side links are substantially shorter than the plate 34 such that, despite the fact that they are substantially upright in this position, and pivot from a higher point on the frame 20, the plate 34 elevates the mid section of the cushion well above the pivots 32 and ensures a forward inclination of the cushion 25. Second, the plate 34 is tilted forward and the center of gravity of the cushion 25 is forward of the pivots 29. Thus, gravity urges the cushion forward maintaining pressure against the flanges 30a and ensuring a relatively stable condition for the cushion 25.

In order to lower the cushion 25 from the leg rest position, it will be seen that the cushion 25 must first be drawn to the rear a short distance to enable the side links 26 to double under. This rearward position for the plate 34 and links 26 is indicated in phantom in Figure 3. From such rearward position the upper end of the cushion 25 is merely raised and pivoted forward. It will be noted that elevating the upper end of the cushion 25 when in the leg rest position will aid the initial rearward motion by action of the links 26.

When not wanted, the whole device may be swung up and latched to the back 16 of the front seat. For this purpose, the side bars of the frame 20 are provided with a bracket 37 carrying a latch 38 on a pivot 39, a spring 40 urging the latch to catching position; and the seat back is provided with a slotted keeper 41 for holding the latch. The keeper slot is long vertically to accommodate reclining adjustments of the seat back from full sitting position to full reclining position. This movement in the keeper is needed because the frame pivot 21 is on a fixed part and spaced from the pivot 42 of the back.

The cushion 15 in most seats adjusts with the back. In Fig. 3, the sitting position of the cushion is shown in full lines and the reclining position in dotted lines. The pad 25b, sometimes referred to as an ottoman, serves as a comfortable leg rest in either position of the seat, though better in the reclining position.

It is thus seen that the invention provides a very simple, comfortable and convenient convertible rest, that it takes up little space, is quickly changed, and in folded position permits all necessary turning and reclining movements of the seat on which it is carried.

While one embodiment has been described, it is to be understood that there may be various embodiments within the limits of the prior art and the scope of the subjoined claims.

What is claimed is:

1. A combination foot rest and leg rest for the back of a vehicle chair comprising, a frame pivotally connected to the back of the chair for movement upward against the said back and downward to a rearward slanting position, a cushion, links swingably connecting said cushion to said frame to form a four sided linkage system including said frame, said cushion and said links as sides, the difference between the length of two adjacent sides of the said linkage system being substantially equal to the difference between the length of the other two sides, and the side of the linkage system forming the upper connection between the cushion and the frame when the frame is in the said downward and rearward slanting position being substantially shorter than the side of the linkage system diametrically opposite thereto.

2. A combination foot rest and leg rest for the back of a vehicle chair comprising, a frame pivotally connected to the back of the chair for movement upward against the said back and downward to a rearward slanting position, a cushion, links swingably connecting said cushion to said frame to form a four sided linkage system including said frame, said cushion and said links as sides, the difference between the length of two adjacents sides of the said linkage system being substantially equal to the difference between the length of the other two sides, the side of the linkage system forming the upper connection between the cushion and the frame when the frame is in the said downward and rearward slanting position being substantially shorter than the side of the linkage system diametrically opposite thereto, and stops both limiting movement of the cushion downward when the cushion is in alignment with the frame with the linkage system substantially collapsed, and limiting forward motion of the cushion when the linkage system is open.

3. The combination foot rest and leg rest described in claim 1 further characterized by the side of the linkage system which forms the lower connection between the frame and the cushion, being pivotally connected to the lower end of the frame and pivotally connected to an intermediate point in the back of the cushion, and consisting of a metal plate.

4. A combination foot rest and leg rest for the back of a vehicle chair comprising, a frame pivotally connected to the back of the chair for movement upward against the said back and downward to a rearward slanting position, a cushion having a substantially rigid back and an upholstered front, links swingably connecting said cushion to said frame to form a four sided linkage system including said frame, said cushion and said links as sides, the difference between the length of two adjacent sides of the said linkage system being substantially equal to the difference between the length of the other two sides, the side of the linkage system forming the upper connection between the cushion and the frame when the frame is in the said downward and rearward slanting position being substantially shorter than the side of the linkage system diametrically opposite thereto, and the cushion being mounted in the linkage system with its rigid back uppermost and in alignment with the frame when the linkage system is substantially collapsed whereby pivoting the cushion to open the linkage system inverts the cushion rendering its upholstered front uppermost.

JOHN J. MAYER.

REFERENCES CITED

The following references are of record in the file of this patent:

UNITED STATES PATENTS

| Number | Name | Date |
|---|---|---|
| 2,040,942 | Katenkamp | May 19, 1936 |
| 2,431,661 | Ragsdale et al. | Nov. 25, 1947 |
| 2,432,072 | Trautvetter | Dec. 2, 1947 |
| 2,472,339 | Patton | June 7, 1949 |

FOREIGN PATENTS

| Number | Country | Date |
|---|---|---|
| 544,640 | France | June 29, 1922 |
| 297,648 | Great Britain | Sept. 27, 1928 |